UNITED STATES PATENT OFFICE.

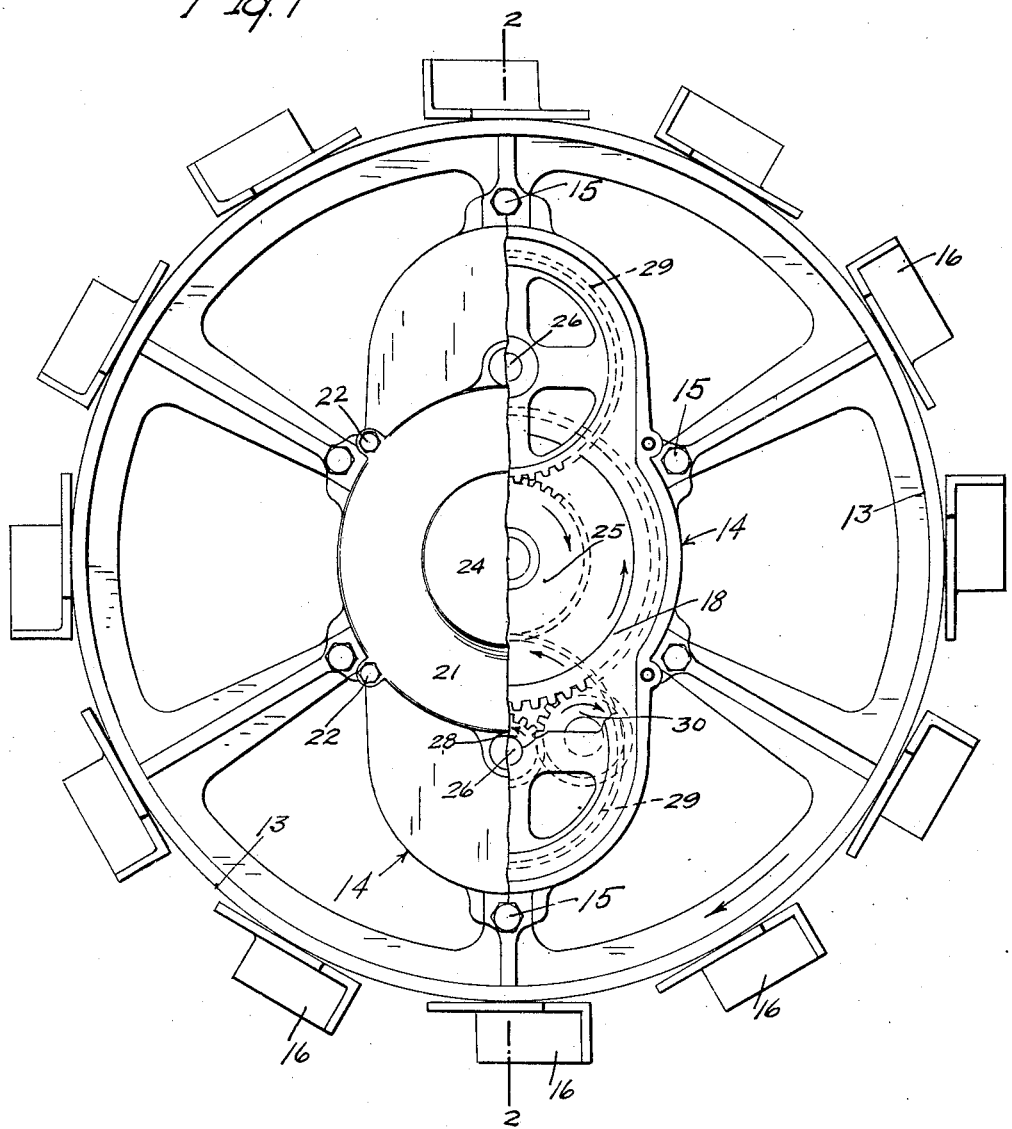

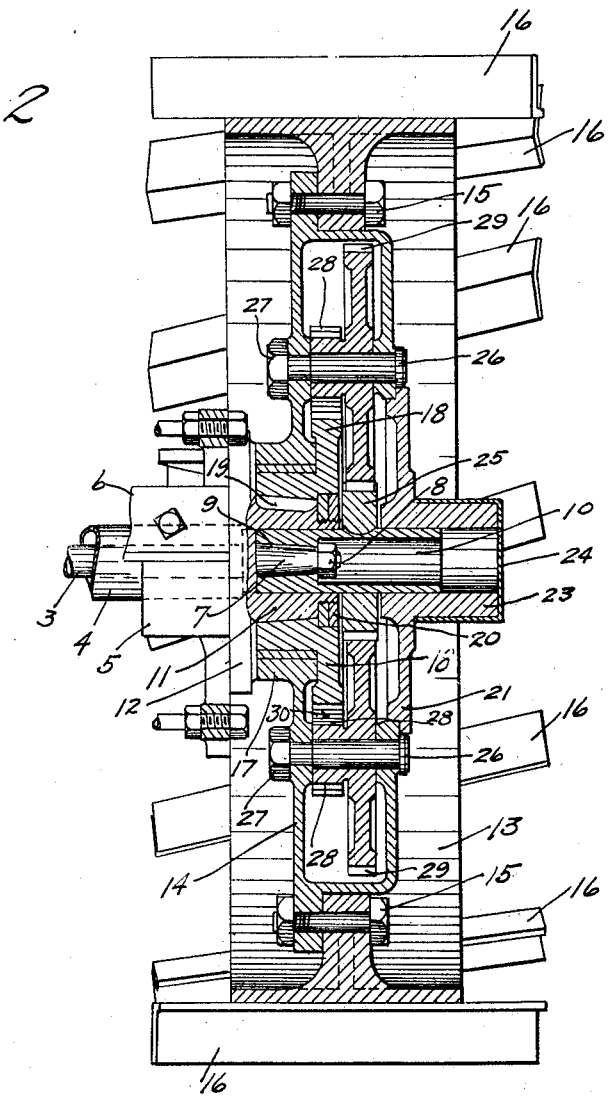

EDWARD J. MEGOW, HERBERT O. DAY, AND ROBERT E. GEHAN, OF ST. PAUL, MINNESOTA, ASSIGNORS, BY DIRECT AND MESNE ASSIGNMENTS, TO CONVERTIBLE TRACTOR CORPORATION, OF ST. PAUL, MINNESOTA, A CORPORATION OF SOUTH DAKOTA.

TRANSMISSION TRACTION-WHEEL.

1,369,042.            Specification of Letters Patent.            Patented Feb. 22, 1921.

Application filed December 21, 1917. Serial No. 208,213.

*To all whom it may concern:*

Be it known that we, EDWARD J. MEGOW, HERBERT O. DAY, and ROBERT E. GEHAN, citizens of the United States, residing at St. Paul, in the county of Ramsey and State of Minnesota, have invented certain new and useful Improvements in Transmission Traction-Wheels; and we do hereby declare the following to be a full, clear, and exact description of the invention, such as will enable others skilled in the art to which it appertains to make and use the same.

Our invention is directed to the improvement of that type of transmission traction wheel wherein the power increasing and speed reducing mechanism is incorporated in the wheel structure; and has for its object to provide such an improved wheel especially for use as a substitute for the customary traction wheel of an automobile or truck, to thereby convert such motor propelled vehicle into a slow moving tractor having great pulling power.

To the above end, generally stated, the invention consists of the novel devices and combination of devices hereinafter described and defined in the claims.

Traction wheels of the character herein made the subject matter of this application are, for example, adapted to be applied to the rear axle of a Ford or of any of the standard automobiles, but may also be applied to the driving axles of heavier motor propelled vehicles such as auto trucks. In motor propelled vehicles of the above character the traction wheels are, as is very well known, directly secured to the outer ends of the axle and are driven through a differential gear.

When speed reducing and power increasing traction wheels are substituted on such vehicles for the customary wheels, they must, of course, be driven in the same direction as the axle by a relatively low speed. Hitherto this has been accomplished by using a large internal gear in the wheel structure. These internal gears increase the cost and complicate the construction of the wheel transmission mechanism. External spur gears are preferable to internal gears in a structure of this character, and elsewhere, for that matter, and we have found that by a novel arrangement thereof the construction of the wheel transmission mechanism may be not only reduced in cost, but increased in efficiency and generally simplified.

The preferred form of the improved wheel is illustrated in the accompanying drawings wherein like characters indicate like parts throughout the several views.

Referring to the drawings:

Figure 1 is a view in side elevation with some parts broken away showing a traction wheel embodying our invention; and Fig. 2 is a vertical section taken approximately on the line 2—2 of Fig. 1.

The numeral 3 indicates the customary axle of the motor propelled vehicle, the same being contained within an axle casing 4 and journaled in the customary bearings 5 which latter are rigidly secured in the usual way to the vehicle frame 6. The axle 3 has tapered end portions 7 that terminate in threaded trunnions equipped with nuts 8. The customary vehicle wheels are securable on the tapered axle ends 7 by means of the nuts 8 and usually by other coöperating means such as a key 9.

As one feature of this invention a tubular axle extension 10, at its inner end is snugly fitted onto each tapered axle end 7 and thereto rigidly secured by the coöperating nut 8 and key 9. In this way the axle extensions 10 form rigid outer extensions of the axle and are caused to positively rotate therewith. The bore in the outer portion of the axle extension 10 is large enough to permit of the engagement of the nut 8 by a suitable socket wrench.

To afford the main bearings for the improved transmitting traction wheels, non-rotary bearing sleeves 11 are telescoped around the inner portions of the respective axle extensions 10; and these bearing sleeves are provided with base flanges 12 that are rigidly anchored to the frame structure 6.

The transmitting traction wheel, as preferably constructed, comprises a rim and spoke structure 13 and a hub and gear case structure 14 which parts, as shown, are rigidly connected by nut-equipped bolts 15. The rim structure 13 is shown as provided with large transversely projecting traction lugs or bars 16. The inner wall of the gear case 14 is formed with a bearing hub 17 that rotates upon the hub of a non-rotary spur gear 18. The hub of this gear 18 is tightly fitted upon the bearing sleeve 11 and is secured against rotation in respect thereto by a key 19 and is held against lateral displacement by annular clamping nuts 20 that have screw-threaded engagement with the reduced end of the bearing sleeve 11.

By referring to Fig. 1 it will be noted that the gear case 14 is elongated in one direction diametrically of the wheel, and at its outer side is provided with a circular opening that is normally closed by a detachable plate 21 secured thereto by machine screws 22, or the like. This side plate 21 is formed with a hub 23 that is journaled on the projecting end of the axle extension 10. The normally open outer end of the hub 23 is preferably closed by a cap 24.

Keyed, or otherwise secured, to the axle extension 10, for rotation therewith is an axial spur gear 25 of smaller diameter than the anchored or non-rotary gear 18. At diametrically opposite points the gear casing 14 is provided with transversely extended spindle bolts 26 detachably held in place by nuts 27. Loosely journaled on the spindle bolts 26 and connected to common hubs, are spur pinions 28 and spur gears 29. The spur gears 29 mesh with the axial driving gear 25. The spur pinions 28 do not mesh with the alined, anchored gear 18 but do mesh with idle intermediate spur pinions 30 that are located within and journaled to the inner wall of the gear casing 14 and in turn directly mesh with the said anchored or non-rotary gear 18.

The duplex arrangement of the gears 28—29 and 30 is preferred because it better distributes the strain and wear, but is not absolutely necessary since the driving motion would be transmitted by one set thereof.

The direction of rotation of the axle traction wheel and intermediate gears is indicated by arrows in Fig. 1, and by reference thereto it will be noted that the axle 3 and traction wheel 13—14 will be driven in the same direction but the latter at a very much lower speed than the former. In the train of gears shown there is a tendency to drive the anchored gear 18 in a direction reverse to the direction of rotation of axle 3, but since this anchored gear cannot thus rotate, it becomes a base of re-action against which the power is transmitted and causes the traction wheel to rotate in the direction of rotation of the axle. With the gears designed as illustrated, the traction wheel will be rotated in the direction of the axle at a relative speed of about one rotation of said wheel for ten rotations of said axle. Thus the speed is greatly reduced and the power correspondingly increased so that an automobile engine, for example, of moderate horse power may be used to draw very heavy loads, such, for example, as plows, or may be used to do any of the various kinds of work performed by tractors.

What we claim is:

1. The combination with a vehicle wheel and a bearing therefor, of an axle extension detachably secured to said axle, a driving spur gear secured to said axle extension, an anchored external spur gear surrounding said axle structure, a traction wheel having a gear housing journaled for movement around said axle structure, external spur gears journaled to said housing and connecting said driving spur gear to said anchored spur gear, the said housing having an inner plate journaled on the hub of said anchored gear, and having an outer plate journaled on said axle extension.

2. The combination with the frame and driving axle of a motor vehicle, said axle having a spindle adapted to receive the customary wheel, of an axle extension rigidly securable to said axle spindle, an anchored bearing sleeve surrounding the inner portion of said axle extension, an external spur gear anchored to said sleeve, a transmitting traction wheel having a gear housing provided with an inner plate journaled on the hub of said anchored gear, said housing having a rigidly secured detachable outer plate journaled on the extended end of said axle extension, an external driving spur gear secured to said axle extension within said housing, an external spur gear and an external spur pinion located within the said housing and journaled thereto for common rotation, said spur gear meshing with the said driving spur gear, and an intermediate external spur pinion located within said housing, journaled thereto and meshing with said spur pinion and said anchored spur gear.

In testimony whereof we affix our signatures in presence of two witnesses.

EDWARD J. MEGOW.
HERBERT O. DAY.
ROBERT E. GEHAN.

Witnesses:
EVA E. KÖNIG,
F. D. MERCHANT.